(12) United States Patent
Khan (10) Patent No.: US 10,983,355 B2
(45) Date of Patent: Apr. 20, 2021

(54) METHOD AND SYSTEM FOR OCCLUSION CAPABLE COMPACT DISPLAYS

(71) Applicant: Sajjad Ali Khan, Santa Clara, CA (US)

(72) Inventor: Sajjad Ali Khan, Santa Clara, CA (US)

(73) Assignee: Sajjad A. Khan, Santa Clara, CA (US)

( * ) Notice: Subject to any disclaimer, the term of this patent is extended or adjusted under 35 U.S.C. 154(b) by 0 days.

(21) Appl. No.: 16/768,003

(22) PCT Filed: Jan. 2, 2019

(86) PCT No.: PCT/IB2019/000076
§ 371 (c)(1),
(2) Date: May 28, 2020

(87) PCT Pub. No.: WO2019/135165
PCT Pub. Date: Jul. 11, 2019

(65) Prior Publication Data
US 2020/0371356 A1 Nov. 26, 2020

Related U.S. Application Data

(60) Provisional application No. 62/613,369, filed on Jan. 3, 2018, provisional application No. 62/740,119, filed on Oct. 2, 2018.

(51) Int. Cl.
*G02B 27/01* (2006.01)
(52) U.S. Cl.
CPC .. *G02B 27/0172* (2013.01); *G02B 2027/0118* (2013.01); *G02B 2027/0123* (2013.01)
(58) Field of Classification Search
CPC ............ G02B 27/0172; G02B 27/0101; G02B 27/017; G02B 27/28; G02B 5/30; G02B 6/0038; H04N 13/307; H04N 13/156; G02F 1/1347; G02F 1/133528
See application file for complete search history.

(56) References Cited

U.S. PATENT DOCUMENTS

| 5,526,184 | A | * | 6/1996 | Tokuhashi | ........... G02B 27/017 |
| | | | | | 359/489.07 |
| 10,732,407 | B1 | * | 8/2020 | Wood | ......... G02B 5/18 |
| 2016/0266389 | A1 | * | 9/2016 | Ouderkirk | ................ G02B 5/30 |
| 2016/0327906 | A1 | * | 11/2016 | Futterer | ............... G03H 1/2286 |
| 2017/0003532 | A1 | * | 1/2017 | Kondoh | ................ G02F 1/1347 |
| 2017/0075119 | A1 | * | 3/2017 | Schultz | ................ G02B 6/0038 |
| 2017/0176751 | A1 | * | 6/2017 | Ouderkirk | .............. G02C 7/086 |
| 2018/0324332 | A1 | * | 11/2018 | Konttori | .............. H04N 13/156 |
| 2019/0004350 | A1 | * | 1/2019 | Sahlsten | ................ G02B 27/28 |
| 2019/0227492 | A1 | * | 7/2019 | Kroll | .................. G02B 27/0101 |
| 2019/0265477 | A1 | * | 8/2019 | Perreault | .............. H04N 13/307 |
| 2020/0033672 | A1 | * | 1/2020 | Leister | .............. G02F 1/133528 |

\* cited by examiner

*Primary Examiner* — Fred Tzeng (57) ABSTRACT

In one embodiment, a method of rendering images includes providing eyewear having at least one lens capable of mutual occlusion for optical see-through HMD applications. A display module routes image from an ambient real world environment first through a spatial light modulator so that selective portions of the real world scene can be pixel-wise occluded. The resultant modulated image is then combined with another computer generated virtual image and then routed to the viewer. In another embodiment an electrically actuated switchable occlusion mechanism is provided within the display module that allows the ability to provide the occlusion capability only when needed.

65 Claims, 5 Drawing Sheets

METHOD AND SYSTEM FOR OCCLUSION CAPABLE COMPACT DISPLAYS

This application claims priority to U.S. provisional patent application No. 62/613,369, filed on Jan. 3, 2018, U.S. provisional patent application No. 62/740,119 filed Oct. 2, 2018, and Paris Cooperation Treaty (PCT) Application No. PCT/US2018/000016 filed on Feb. 16, 2018 which are hereby incorporated by reference here in their entirety.

TECHNICAL FIELD

This relates generally to a system and method for displaying images, and more particularly, to Head Mounted Displays (HMD) and Near Eye Displays (NED) with pixel-wise hard-edge occlusion capability for optical-see-through Augmented Reality, Virtual Reality or Mixed Reality applications.

BACKGROUND

Head mounted devices often include displays. These are used in Augmented Reality, Virtual Reality or Mixed Reality applications.

Augmented Reality, AR, is a fundamentally transformative technology which can enable new and unique ways of accessing and perceiving digital information essential to our everyday life. AR technology is considered to be the next big platform after mobile computing as in the form of smart phones.

Figure 1:
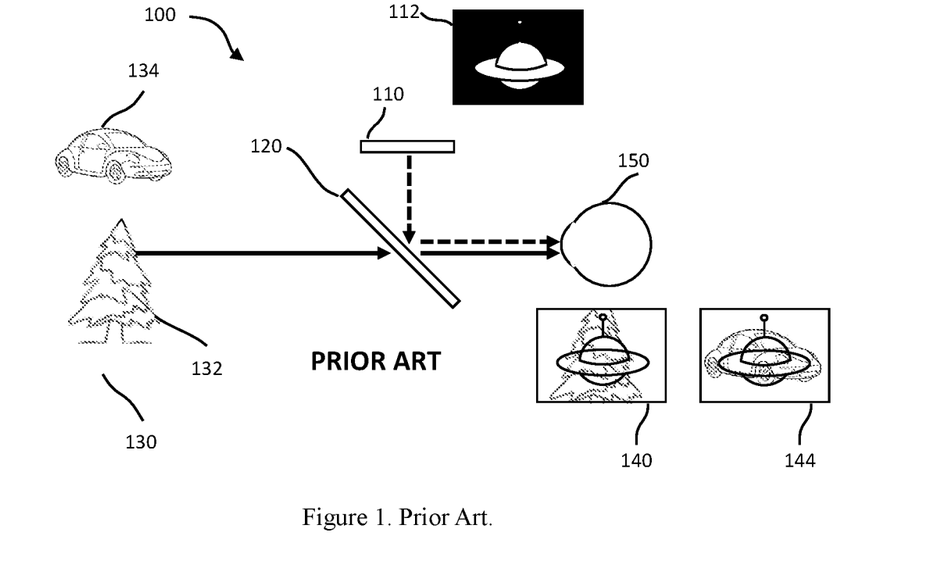
FIG. 1. Prior Art Optical See-Through Augmented Reality Display architecture.

An AR display may be head-mounted display (HMD), a Heads Up Display (HUD) or otherwise a conventional display such as a mobile device or a computer. As shown in FIG. 1, a prior art AR display architecture uses a combiner to overlay computer generated virtual content on top of the real world scene.

FIG. 1 shows a prior art HMD architecture, 100. It consists of a display Spatial Light Modulator (SLM), 110, for creating virtual content, 112, and a combiner optic, 120. The combiner optic, 120 combines the Real World Image, 130, and the Virtual Image, 112. A viewer perceives the combined image, 140, as seen by their eyeball, 150.

The conventional combiner optic, 120, adds the luminance values from the two input ports, i.e.: Real World side, 130, and the Virtual SLM side, 110, and hence the net luminance at the observer's eye is a simple sum of the luminances at these two input ports. When the observer's surroundings are dark, the virtual content, 112, is displayed to the observer's eye, 150, with fidelity. Alternatively, when there is any light background visible to the observer as in typical ambient daylight environments; a significant portion of the displayed content gets washed out or obscured by the lightness of the ambient background. This is depicted in the combined image, 140, in FIG. 1, where a tree, 132, is in the ambient real world scene, 130, filling the background of the virtual image, 112. The observer's eye perceives portions of the virtual image to be see-through and hence giving the impression that the virtual content is not physically present in front of them. As the observer moves their head around the real world scene, other objects, such as a car, 134, appear(s) in the background of this see-through virtual content shown in the perceived image 144. This see-through nature of the virtual content renders such a prior art HMD architecture to be of very limited use as the viewer's brain perceives a conflict between the see-through virtual content and the real world scene visible in the background.

There are other scenarios such as bright indoor lamps, bright headlights visible from the opposing incoming traffic side, and sunlight either outdoors or peering from windows that can cause washout of the virtual content. Typically, to prevent washout due to presence of bright ambient light, the luminance of the virtual content is increased which results in higher power consumption and impacts the overall size and weight of the system. Also, presence of such ambient luminance results in decreased dynamic range and wasted bit-depth. The perceived color gamut also gets reduced and overall image quality is impacted.

If a dark virtual object is to be represented while the ambient real environment is well-lit, the darkest black that can be projected is equal to the ambient environment's luminance. This means the virtual image will be washed out and the virtual object may appear to be unrealistic due to its lack of contrast.

It would therefore be desirable to provide display systems for HMD electronic devices that provide control over ambient luminance in a spatially selectable manner so that the observer can experience high contrast as and where desired. Furthermore, it is desirable to prevent increase in power consumption when there is luminance competition due to the presence of ambient light. It is also preferred to reduce the size and cost of the system while still utilizing low power.

With the use of a simple optical combiner, the luminances from the two scenes add up such that the virtual objects lack realistic appearance. The combiner typically has partial transmission and reflection which allows the combination of the real scene with the virtual content. For example, a combiner with 50%/50% transmission and reflection will allow half of the luminance from each of the real scene and the Augmenting SLM side makes it to the viewer's eye. When an ambient real world environment is dimly lit, virtual objects of varying luminances can be overlaid on the real world scene. But when the ambient environment is a typical indoor day-time situation and is well lit, then the virtual objects portrayed need to be brighter than the first case so that they can stand out and be noticeable in the scene. Typical micro-display technologies modulate light such that a dark pixel has no light emitted towards the viewer. As an example, a micro-display emits 1000 $Cd/m^2$ for full-white (gray-level 255 in an 8-bit image) and emits 1 $Cd/m^2$ for Black (gray-level 0 in an 8-bit image). This means the micro-display has a native ON/OFF contrast ratio of 1000:1. Let's assume, in a typical day-time indoor home or office situation where the ambient illuminance is 250 lux. Assume the background is a typical light colored diffuse white paint that back-scatters the incident light randomly. Hence the resultant luminance from the ambient white wall is ~80 $Cd/m^2$. Since in a HMD, using the above example of a 50/50 combiner, the 50% of light from a pixel of the SLM gets combined with 50% of the light from the ambient scene. Hence in the case of the full-white pixel projected from the SLM, we net a luminance of 540 $Cd/m^2$ (=0.5×80+0.5× 1000) to the observer. Whereas, in this case of a black pixel projected from the SLM, we get a net luminance of 40.5 $Cd/m^2$ (0.5×80+0.5×1) to the observer. Thus the net Full-On/Full-Off contrast as witnessed by the observer is 13.33 (=540/40.5). Recall, that the native micro-display ON/OFF contrast ratio was 1000:1. This means the using the typical partial transmission/reflection combiner results in the loss of contrast by roughly two orders of magnitude. The example listed here is for a very typical indoor use case with a 50/50 combiner. In general, there is trend towards brighter day-light type indoor luminaires usage with higher illuminance and also designs of combiners with high transparency for the ambient light such as 70%/30%. In the case of 70% transmittance and 30% reflectance combiner, the situation gets even worse with the net contrast to the observer's eye of about 6:1 using the above-mentioned micro-display luminance and contrast. Furthermore, in scenarios where there is even higher ambient illuminance such as sunlight pouring through windows or outdoor sunlight, the contrast goes down to even lower values. With such low values of net contrast, the use of high bit-depth and high dynamic range defeats the purpose as most of the virtual content is below the threshold luminance discernibility. Hence the observer may not get the perception of Black in such scenarios and a majority of the content will be washed-out.

One solution to increase the net contrast is to increase the luminance of the micro-display. Although, in principle it helps, but at the expense of power consumption, and size increase as for HMD applications a larger battery size will be needed. Another alternative is to tint the combiner such that the real world ambient scene has lower transparency whereas the micro-display is located inside the housing such that it doesn't get impacted by the lower transparency of the tinted combiner. For example, a 50% tint will reduce the ambient luminance by a factor of 2 and hence increase the net contrast to the observer by 2 times. Although it helps the net contrast but comes at the expense of dimming the whole ambient scene and there maybe dimly lit objects present in the real world scene that become difficult to see altogether due to this uniform tinting approach.

Rendering occlusion of a virtual object by a real world object is quite simple: the real object is in-front of the virtual one, so one needs to render the virtual object only where the real object's boundaries end. This is also termed 'Soft-Edge' occlusion. On the contrary, when a virtual object is in front of a real world object, one can only try to increase the brightness of the virtual display when a prior art AR display architecture is used. This increases the power consumption of the display illumination. Since contrast of a display is inversely related to the black level, hence it is preferable to instead develop a method to increase the contrast in a pixel-wise manner.

To overcome this limitation of low net contrast, one needs to be able to develop a "Subtractive Display" which can subtract light from the ambient scene in a pixel-wise controlled fashion so that the locations where a virtual object is desired to be projected, one can subtract out the luminance of the ambient real environment first and then portray the virtual object with wider dynamic range. Sometimes this ability to subtract light is called mutual-occlusion or hard-edge occlusion. This ability to pixel-wise spatially control the contrast allows for a high net contrast, low power consumption, small form factor, long battery-life operation in the presence of high ambient luminance without having to apply tinted coatings.

DETAILED DESCRIPTION OF THE INVENTION

The present disclosure relates generally to augmented reality display systems, and more particularly to display systems having enhanced capabilities. In this disclosure, we teach methods and systems to provide mutual occlusion capability for optical see-through HMD applications. Various solutions are presented including freespace optics, compact waveguide based optics, and planar lightfield modulation approaches for HMD applications.

Figure 2:
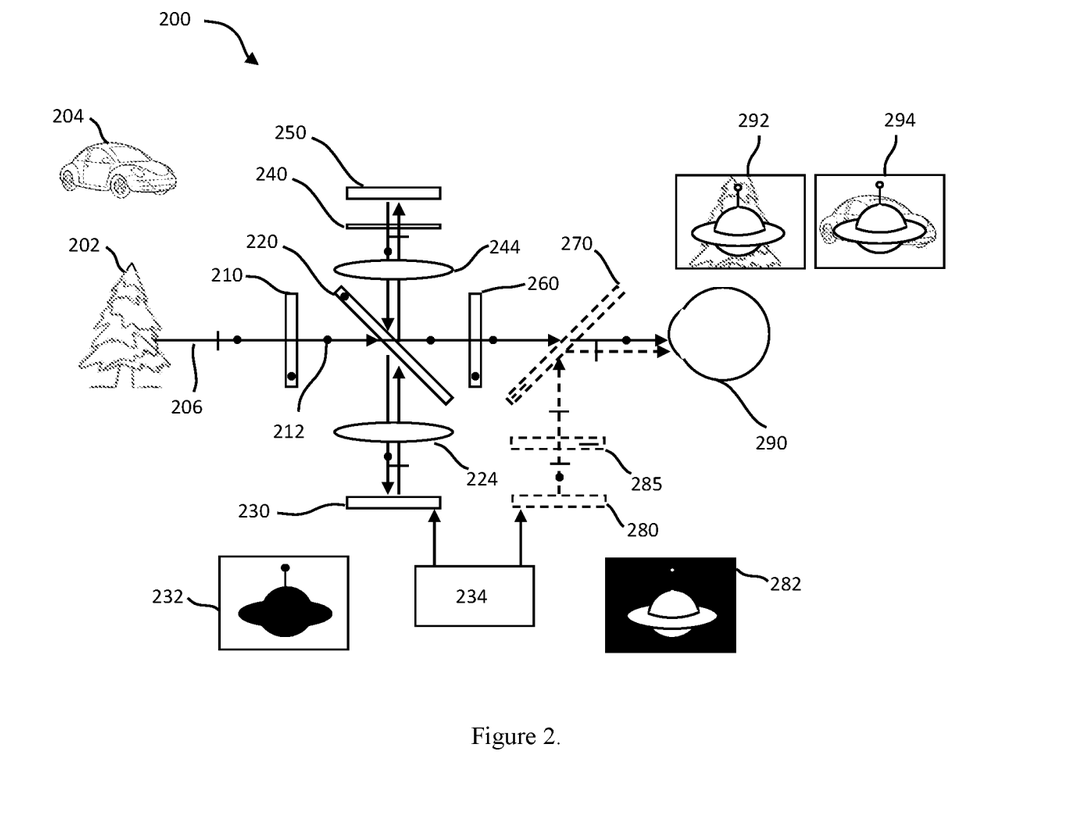
FIG. 2 Breakthrough optical architecture with occlusion capability.

FIG. 2 shows our breakthrough optical architecture with occlusion capability. It depicts a single layer compact design showing polarization based freespace optic combiners, OC, for both Occlusion and Augmenting SLMs and corresponding polarization multiplexing and routing scheme. The OC consists of multiple ports where light can enter and/or exit. First, light from the ambient real world scene, 202, is linearly polarized, 206, by a first absorptive linear polarizer, 210, along a preferred linear direction, 212. A reflective polarizer, 220, with a reflection polarization axis, $R_{RP}$, that is substantially parallel to 212, and said RP, 220, is oriented at an angle such that it reflects the incoming polarized light from the LP in first port, 212, to a second port. A spatial light modulator, 230, is located on the second port of said OC. A QWP and Mirror are located at a third port of said OC which in turn is located opposing the second port of OC. The Quarter Wave Plate, 240, has its slow axis located at approximately 45 degrees from 212 within the plane of its substrate. Based upon a command from a Controller, 234, the SLM modulates the incoming polarized light from the second port and in turn provides outgoing modulated light in at least one of two states of linear polarizations. The modulated light outgoing from said SLM is reflected back at the second port of the OC; where one of the modulated light states of linear polarization from the second port is substantially perpendicularly polarized to 212 and hence it transmits from 220 and emerges at the third port. The QWP, 240, and Mirror, 250, combination in the third port of OC operate on the light and reflect it back at the third port of OC but this time the light is linearly polarized parallel to $R_{RP}$, 212, such that RP, 220, reflects this light and routes it to the fourth port. This light emerges at an exit pupil in the fourth port of OC for the observer's viewing thus allowing a see-through view to the observer's eye, 290. Whereas another state of the modulated light of linear polarization emerging from the SLM is substantially parallel polarized to $R_{RP}$, 212, and hence it reflects from RP, 220, and emerges at the first port hence exiting the OC towards the real world scene; whereby such routing of light away from the viewer's eye gives the perception of blocking of the see-through view to the observer. As the SLM is pixelated, light from specific objects and directions can be blocked or attenuated at will.

Following the example of FIG. 1, if a UFO is to be depicted as a virtual object in front of the observer, a Microdisplay, 280, a Linear Polarizer, 285, and a second Reflective Polarizer, RP2, 270, may be included. The Microdisplay, 280, is connected to said Controller, 234 and receives the virtual object image, 282. The Reflective Polarizer, RP2, 270, reflects light of linear polarization that is substantially perpendicular to 212, thereby allowing the real world scene light occluded by the image, 232, to be combined with the virtual image light, 282, as generated by the Microdisplay, 280. Note, that another Linear Polarizer, 260, may be included for cleanup purposes to mitigate any unwanted light leakage from either the see-through path or the SLM path. The SLM, 230, displays an occlusion mask, 232, provided by the Controller, 234, corresponding to the image of the UFO shown in 282, also provided by said Controller, 234, so that the real world scene content directly behind the virtual object, is blocked from distracting the observer, thereby displaying an image, 292, to the observer that appears to be realistic and immersive. As the observer moves their head around the real world scene, other physical objects do not distract the observer and the immersive-ness of the virtual content is maintained as shown in 294. It is also possible to control the amount of transparency of the virtual content as the SLM allows gray-shade control of the polarized light.

Furthermore, a powered optical element, 224, is utilized to form an image of the real world scene at said SLM for modulation purposes. Such an element, 224, allows to image a certain plane of depth from within the lightfield emanating from the real world scene. If a different depth location is to be brought into focus, either translation means may be provided such as mechanical, or electro-mechanical; or tunable focus optical elements may be utilized for this purpose. In another embodiment, the powered optical element, 224, maybe either refractive or reflective. It may also reside on the same substrate as the Reflective Polarizer, 220, so that the optical system is compact and higher efficiency.

In another embodiment, another powered optical element, 244, is utilized to relay the exit pupil of the system at the Eyebox located in the fourth port of OC. Note that in this disclosure, the term "Eyebox" is used synonymously with the term "Exit Pupil" meaning the location where the observer can place their eye to view a displayed image. The powered optical element, 244, maybe either refractive or reflective. In another embodiment, it may also reside on the same substrate as the Reflective Polarizer, 220, or the Mirror, 250, so that the optical system is compact and higher efficiency.

Furthermore, if it is desired to increase the Field of View of the HMD, rotational means may be provided such as mechanical, or electro-mechanical; or beam steering optical to rotate the Reflective Polarizer, 220, such that a different portion of the real world scene, such as shown in 204, maybe occluded by the SLM, 230. This may be carried out on-demand such that if the observer changes their gaze, the RP, 220, is accordingly rotated to bring a different angular portion of the real world scene into the observer's FOV and occlude objects accordingly such as shown in 294. Accordingly, means maybe provided to track the observer's eye gaze direction for such on-demand FOV steering.

Figure 3A:
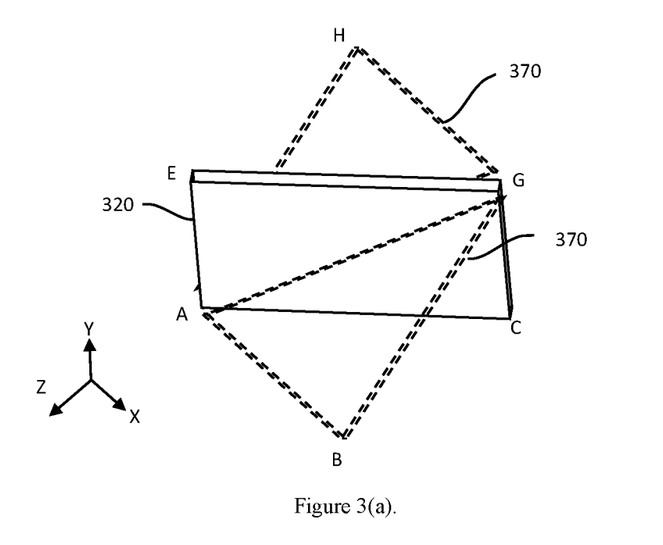
FIG. 3 Compact optical architecture where two polarization based freespace combiners are integrated to include both occlusion and Augmenting SLM in a compact cubic space showing perspective view in (a), top and side views in (b) and (c) irrespective of relative orientation w.r.t. to eye.
Figure 3B:
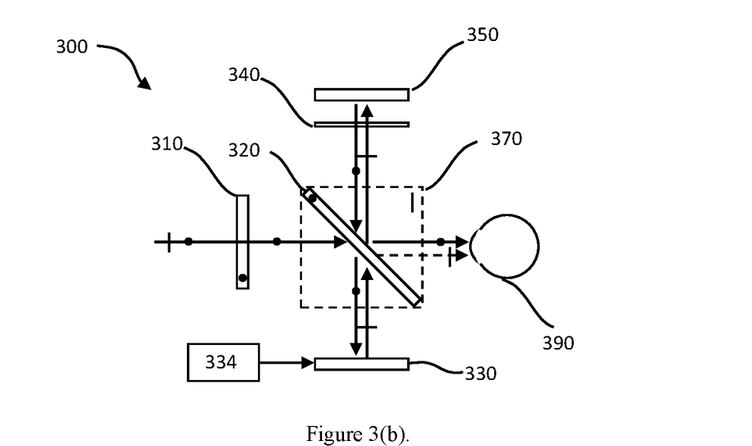
Figure 3C:
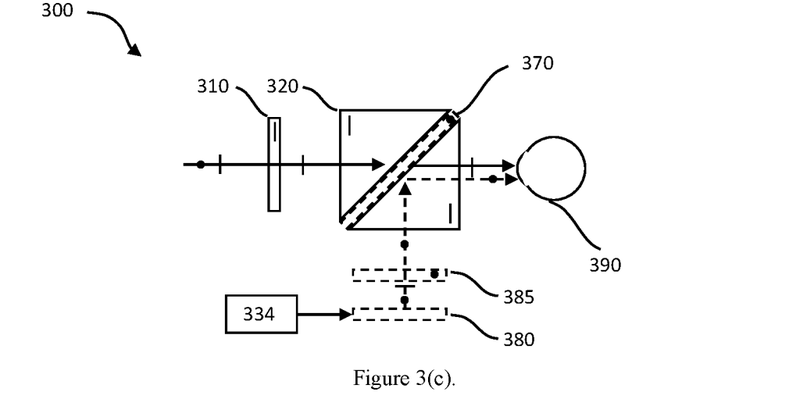

As depicted in FIG. 2, the OC consisted of four ports where light can enter and/or exit. Now, in FIGS. 3(a), 3(b), and 3(c), we show an embodiment, where the OC consists of more than four ports where light can enter and/or exit. This is compact architecture utilizing two Reflective Polarizers, RPs, that are co-located in a single cubic space to reduce the size and weight of the whole system. FIG. 3(a) shows a perspective view of the two Reflective Polarizers, RPs, so that their relative spatial and angular orientations are clearly visible to the reader. The first Reflective Polarizers, 320, is shown to be rectangular in shape such that its edges are denoted by points, A, C, G and E forming the rectangle □ACGE. The polarization reflection axis, $R_{RP}$, for 320, is parallel to the Y-axis in the drawing. The second Reflective Polarizers, 370, is also shown to be rectangular in shape such that its edges are denoted by points, A, B, G and H forming the rectangle □ABGH. The polarization reflection axis, $R_{RP2}$, for 370, is parallel to the X-axis in the drawing such that the two Reflective Polarizers reflect orthogonal linear polarizations of light. Notice, the two Reflective Polarizers, 320 and 370 have two vertices common, i.e.: A and G. Note that Line AG forms the diagonal for both the Reflective Polarizers, 320 and 370. For two planes to cross each other, requires a cut along the crossing line. In FIG. 3(a), the cut is shown in the second Reflective Polarizers, 370, such that it is split into two triangular pieces, ΔABG and ΔAHG. Alternatively, other cut approaches are possible such as each of the two Reflective Polarizers are cut half the way so they slide over each other partially, or one Reflective Polarizers is designed to be a little larger than the other and has a slot cut into it to slide the other Reflective Polarizer through it. It is preferred to not cut the first Reflective Polarizers, 320, which reflects the light from the real world scene as any cut can leak light through it and end up into the viewer's eye thus negatively impacting image quality. Conversely, a cut in the second Reflective Polarizer, 370, only causes a small insertion loss to the light from the virtual content Microdisplay, 380. It is also preferred for the Reflective Polarizers to be on as thin a substrate as practically possible so that the cut doesn't degrade image quality and be unnoticeable visually. Since the cut is in or near the pupil plane, it will not be visible to a noticeable extent as long as its thickness is minimal. FIGS. 3(b) and 3(c) show top and side views of the polarization routing scheme showing the following components: Linear Polarizers, 310 and 385, Reflective Polarizers, 320 and 370, SLM, 330, QWP, 340, Mirror 350, Controller, 334, Microdisplay, 380, and viewer's eyeball 390, respectively. The functionality of these components is the same as described in FIG. 2 above for the corresponding elements. For the sake of simplicity, optical powered elements such as lenses have been omitted as they remain the same as described in FIG. 2 above. One difference between the architectures shown in FIG. 3 and FIG. 2 is that light from the Microdisplay for the virtual content, 380, also passes through the Reflective Polarizers, 320, which incurs a small insertion loss which was not the case in FIG. 2. Appropriate anti-reflection coatings can be utilized to keep this insertion loss at a negligible level. Notice that in FIG. 3, only the see-through polarization state is shown. The other orthogonal polarization state is absorbed by the LP2.

In another embodiment, the sixth port of the OC can be utilized for a camera to look at the real world scene perfectly in the line-of-sight of the observer thus providing useful information about the scene observed by the viewer.

Figure 4:
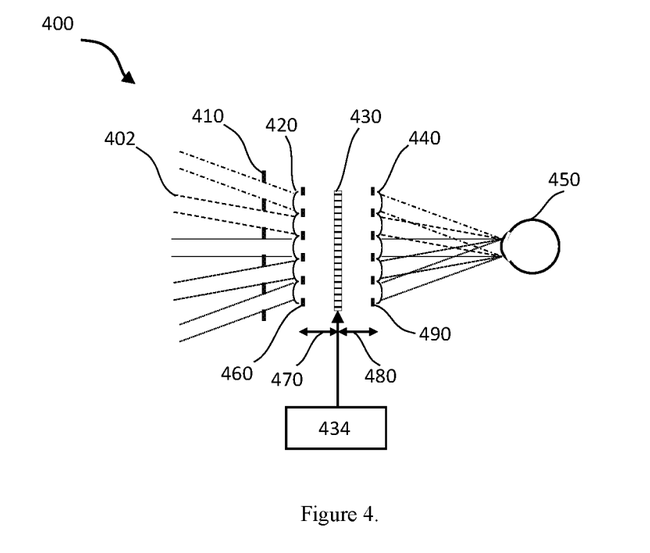
FIG. 4 A very compact planar architecture using two lens arrays for occlusion capability in see-through display applications.

FIG. 4 describes a very compact planar architecture, 400, for occlusion capability in see-through display applications. FIG. 4 shows the compact layout where light, 402, from the real world scene first arrives at a first lenslet array, 420, where the lenslet array forms a spatial image in the focal plane of each of the lenslets. A transmissive SLM, 430, is placed in this focal plane which is located at a distance, D1, denoted 470, away from the first lenslet array. A 2nd lenslet array, 440, is located at a distance, D2, denoted 480, away from the SLM such that it converts back spatial image into an angular lightfield. This angular lightfield arrives at an exit pupil located a certain distance away for viewing by an observer's eyeball, 450. Since, the first lenslet array forms a spatial image at the SLM plane, a controller, 434, commands the SLM to attenuate image light from selected pixels of said SLM such that after passing through the $2^{nd}$ lenslet array, 440, the observer, 450, perceives the objects at corresponding angular locations in the real world scene to be blocked or attenuated in their visible intensity from their see-through view.

The components listed in such an architecture allow for the display system to be very compact and lightweight, thereby enabling their incorporation into typical prescription eyeglasses form factor. The total thickness maybe a few milli-meters and weight of less than 10 grams. Power consumption is also envisioned to be very small as a normally white or transparent mode LC type may be adopted for this application thereby a certain pixel consuming power only when occlusion is required. This may allow for a very long battery life for HMD applications. The compact nature of this planar occluding display architecture allows for integration with any HMD architecture whether, planar waveguide or freespace combiner based hence enabling a huge variety of applications. In order for the lens array to be less noticeable a reflective polarizer (RP) may be utilized on the outside casing of the display such that the polarization reflection axis of the RP is orthogonal to the first linear polarizer utilized for the display. This allows for minimal insertion loss from the inclusion of said RP.

In one embodiment, the distances, D1, denoted 470, and D2, denoted 480, between said first and second lens arrays and the SLM are equal to the focal length of the individual lenslets in the array.

In another embodiment, the system may include means to dynamically adjust the optical path distance, D1, between the SLM and the first lens array such that real objects at varied depth locations in the real world scene from the observer such as near or far can be blocked or attenuated from the observer's view properly. For example, if a real world object is being viewed at infinity, the distance D1 is equal to the focal length of the lenslet; alternatively, when a nearer real world object is to be brought into focus, the SLM may be displaced away from the first lens array such that it is in the image plane for the near object. The SLM will have correspondingly moved closer to the $2^{nd}$ lens array. Since the distance D2 is now smaller than the focal length of the lens, a virtual image is formed at the actual real world object location and hence correctly portraying the object to the observer.

In another embodiment, the system may include means for optical path distance adjustment of distances D1 and D2 such as: mechanical, Piezo-electric, electrical, electronic, optical, electro-optical, or opto-mechanical. Based on the vergence and accommodation information gleaned from an eye tracking system, the distances can be controlled in a feedback loop. Moreover, in yet another embodiment, a Liquid Crystal cell may be included such that it provides the optical path length change mechanism and thereby changing the depth distance in the real world scene which is in focus. Such LC layer maybe further pixelated to vary the depth focal plane across the clear aperture of the display.

The SLM can be chosen from amongst one of the following: Transmissive Liquid Crystal Display, Transmissive MEMS shutter array, Twist Nematic Liquid Crystal, Super Twist Nematic Liquid Crystal, Vertically Aligned Liquid Crystal, Parallel Rubbed Liquid Crystal, Anti-Parallel Rubbed Liquid Crystal, pi-cell Liquid Crystal, Ferro-electric Liquid Crystal, Polymer Dispersed Liquid Crystal, Polymer Stabilized Liquid Crystal, or Polymer Network Liquid Crystal. The twist nematic type LCD panels are a good choice as they are fairly wavelength (color) and polarization insensitive.

In another embodiment for Liquid Crystal based SLMs, the system will also include a first absorptive linear polarizer, LP1, located facing the real world scene; wherein the LP1 is meant to polarize the lightfield incident on it from the real world scene; and a $2^{nd}$ absorptive linear polarizer, LP2, located facing the Eyebox such that the two polarizers have their polarization transmission axes either substantially parallel or substantially perpendicular to one another. It is preferred for the display system to have a normally white or see-through mode when the power is OFF so that the observer's eye is mostly visible from the outside view. For TN or STN LCD type, the pair of polarizers, LP1 and LP2 will have perpendicular orientations so that the display is normally see-through. For other LCD types, the two polarizers, LP1 and LP2 will have parallel orientation as well as their polarization direction will also need to align with the nematic director of the particular LC cell chosen.

For compatibility with off-the-shelf polarized sunglasses, it is preferred that the first linear polarizer, LP1, be oriented with its transmission axis vertical to block a majority of the glare from sunlight.

In another embodiment, the system may also include an array of baffles to prevent light leaking from one lenslet into a neighboring pixel of the SLM. These are shown in FIG. 4 as the arrays 410, 460 and 490.

In another embodiment, the SLM has a plurality of different pixel sizes such that real world objects of various angular dimensions can be occluded or attenuated depending upon their angular location within the FOV. As an example, the SLM may have fine pixel resolution in the center of the FOV and gradually coarser pixel resolution in the periphery of the FOV.

Figure 5:
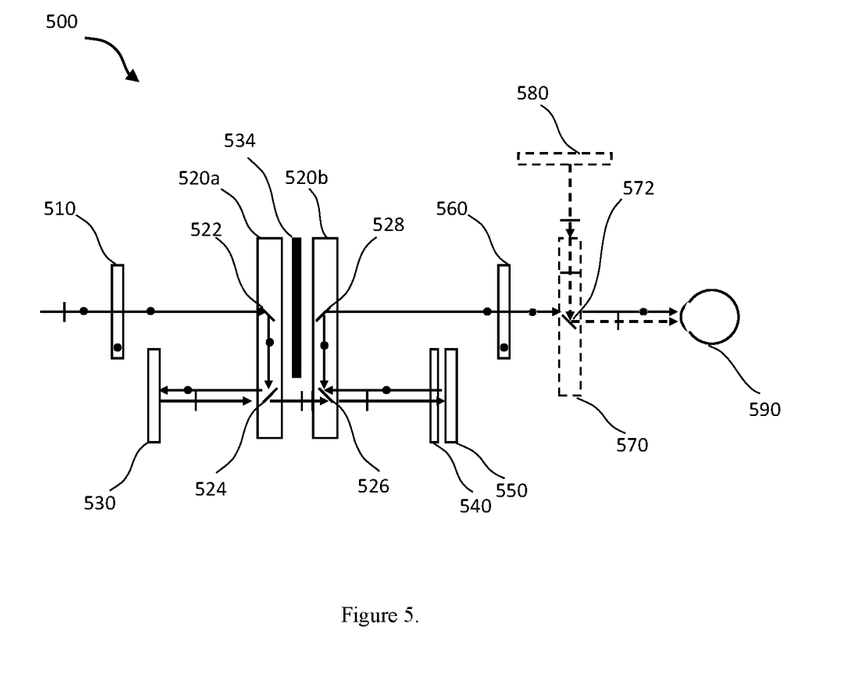
FIG. 5 A compact planar architecture using two planar waveguides for occlusion capability in see-through display applications.

FIG. 5 shows a planar architecture using planar waveguides for a very compact occlusion capable display solution. The system, 500, consists of a first absorptive linear polarizer, 510, located facing the real world scene; wherein the 510 is meant to polarize the lightfield incident on it from the real world scene before directing it to a first waveguide, 520*a*. The waveguide, 520*a*, is a substantially planar optical component which has in-coupling grating, 522, and an out-coupling grating, 524. Incoming lightfield from the real world scene first encounters grating 522 which couples the light into the waveguide where it experiences Total Internal Reflection (TIR) until it encounters the out-coupling grating, 524, which forces the light to out-couple towards an SLM. Appropriate powered optical elements such as lenses maybe utilized to convert the angular lightfield into a spatial image at the SLM plane. The SLM can be controlled to modulate selective regions of the real world scene to occlude. The modulated image is then converted back into the angular domain with the help of a lens and then transmits through the first waveguide, 520*a* and a second waveguide, 520*b*. The second waveguide, 520*b*, has identical in- and out-coupling gratings to couple the light accordingly. A Quarter Wave Plate, 540, and a Mirror, 550, are used in conjunction to rotate the incoming light's polarization by 90 degrees in double-pass geometry. This rotated polarization of light then encounters the second waveguide and in-couples with grating 526, TIR's inside the waveguide until it encounters the out-coupling grating, 528, and then routes outside the waveguide where a $2^{nd}$ linear polarizer, 560 is located to complete the amplitude modulation of the light. Light then is routed towards the Eyebox for viewing by the observer's eye, 590.

The compact nature of this planar waveguide based occluding display architecture allows for integration with any HMD architecture whether, planar waveguide or freespace combiner based hence enabling a huge variety of applications. One example shown in FIG. 5 is denoted 580 for the Microdisplay, and a $3^{rd}$ planar waveguide, 570, for the combiner where light from the $2^{nd}$ linear polarizer, 560 combines with the light from the Augmenting Microdisplay, 580 via the use of an in-coupling grating, 572, for the appropriate polarization and both polarizations emerge in the Eyebox thus allowing the virtual content to have proper occlusion capability.

In another embodiment, the system may utilize the $2^{nd}$ planar waveguide for combing both the occluded light from the SLM, 530, and the virtual image content from the Microdisplay, 580. This may be done via the use of an orthogonal edge of the planar waveguide and via narrowband spectral emission from the Microdisplay, 580.

In another embodiment, the system may utilize a black coating, 534, for preventing light leakage in the see-through path thereby improving mage quality.

Note that although only a single view is shown, it is possible for the virtual content SLM's waveguide combiner to be oriented orthogonally (out-of-plane from FIG. 5) while still utilizing polarization multiplexing. Moreover, although these waveguides are only shown with a single in/out coupler, it is possible to utilize more than one couplers for input, output and for pupil expansion purposes.

Figure 6:
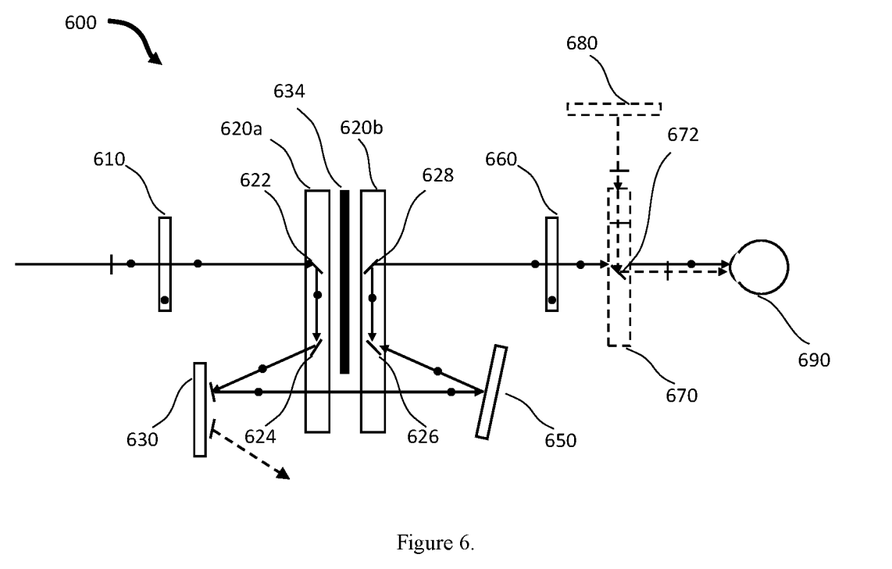
FIG. 6 A compact planar architecture using two planar waveguides for occlusion capability in see-through display applications using DLP SLM.

FIG. 6 shows a planar architecture showing polarization based compact waveguide combiners for both Occlusion and Augmenting SLMs. The occlusion SLM is shown to be DLP Technology. Corresponding polarization routing and multiplexing scheme is also shown. The component part numbers follow those from FIG. 5 and are unchanged. Notice, that in the ON-state for the binary micro-mirror, it routes light from the ambient scene to the observer. Whereas in the off-state, the micro-mirror routes light away from the observer, hence creating a dark state. Similar to FIG. 5, note that although only a single view is shown, it is possible for the virtual content SLM's waveguide combiner to be oriented orthogonally (out-of-plane from FIG. 6) while still utilizing polarization multiplexing. Moreover, although this waveguide is only shown with a single in/out coupler, it is possible to utilize more than one coupler for input, output and perhaps pupil expansion purposes.

In another embodiment, the mirror, 650, shown opposing the DLP SLM for occlusion mask in FIG. 6 can be replaced with a piston-type Phase-only SLM to allow selective control of which objects across the field of view are in focus. This can also be used for emphasizing a specific object by defocusing the irrelevant portion of the field of view.

In yet another embodiment, a focus tunable lens is used to adjust the virtual focal plane at which a scene is rendered. The tunable focus allows for the observer's eye to accommodate at a natural location in a real scene. The optical system can be designed such that the human observer's eye accommodation and vergence are measured to determine their accommodation distance and correspondingly focus the tunable lens such that the displayed image is also located at the same distance. The focus tunable lens may be made of electro-active polymer, electro-wetting lens, or liquid crystal, or MEMS-type flexible membrane mirrors. The extraction grating is designed carefully to ensure, that the observer's accommodation is accounted for and that multiple gratings are multiplexed to render content at appropriately varying depths.

Moreover, the first waveguide based combiner can be an-s-p-phased grating (or set of gratings) that can reflect both S and P polarizations. This enables use of DLP imagers that are higher efficiency and polarization and wavelength in-sensitive. This prevents the use of polarized light and maintains high efficiency. A $2^{nd}$ waveguide based combiner is used for AR that projects the virtual content and can be either Holographic Bragg Grating or surface relief grating(s).

Figure 7:
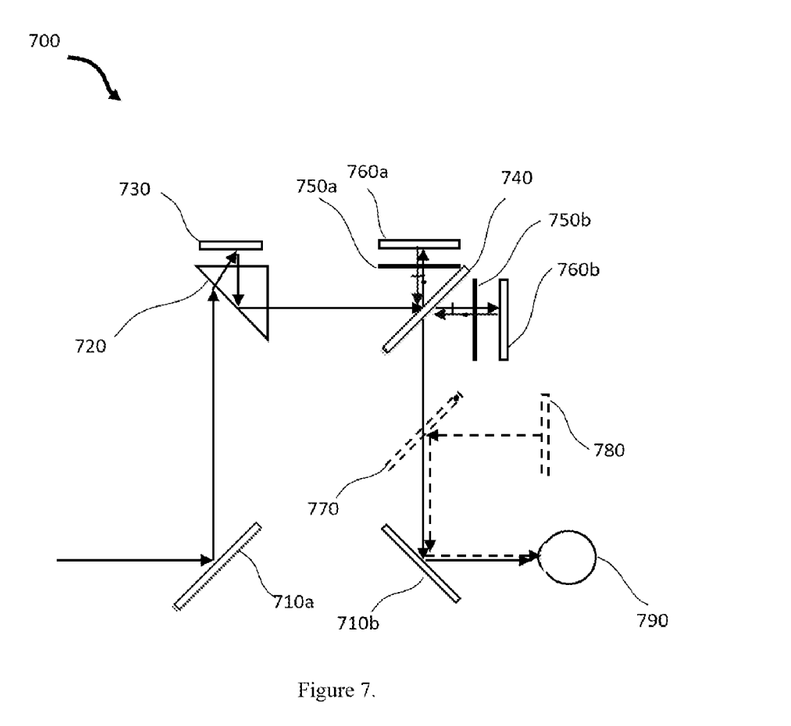
FIG. 7 An randomly-polarized DLP wrap-around architecture showing light routing scheme. Notice, that freespace optic combiners are used for both for Occlusion and Augmenting SLMs. Corresponding light routing and multiplexing scheme is also shown.

FIG. 7 teaches an un-polarized DLP wrap-around architecture showing light routing scheme. The system, 700, consists of a two mirrors, 710a and 710b, a prism, 720, DLP SLM 730, a Reflective Polarizer, 740, two Quarter Wave Plates, 750a and 750b, two Mirrors, 760a and 760b, a virtual content Microdisplay, 780 and a combiner 770. Note, that freespace optic combiners are used for both for Occlusion and Augmenting SLMs. Corresponding light routing and multiplexing scheme is also shown. Such DLP-based microdisplay technology enables the optical system to be higher throughput. Notice, that a Polarization selective Narrowband reflective polarizer, 770, is used for multiplexing the broad spectral band from the ambient scene with the narrow polarized spectral band from the virtual content SLM, 780. Optical efficiency for the see-through path can be nearly 50% which makes it a very good candidate for occlusion.

In some of the Figures, optical components with optical power such as lenses or mirrors for focusing are not shown but those familiar in the art can imagine their utilization in the appropriate locations, such as but not limited to light collection, focusing and magnification without deviating from the fundamental concept as taught in this disclosure.

Figure 8A:
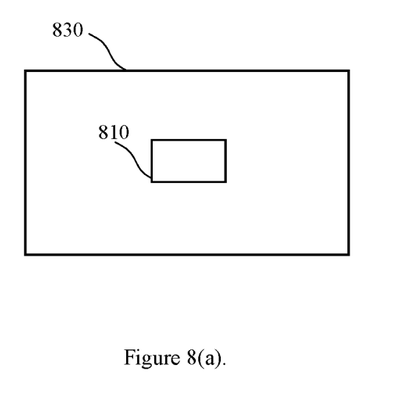
FIGS. 8(a) and 8(b). Display topology with a steered Wide Field of View for occlusion whereas the periphery has extended virtual display without the occlusion capability.
Figure 8B:
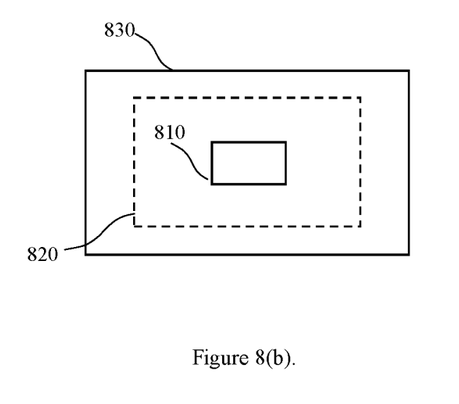

FIG. 8(a) depicts a display topology with a central Field of View, 810, having occlusion capability while the periphery, 830, has an extended virtual display without the occlusion capability. FIG. 8 (b) shows the wider central Field of View having the occlusion capability, 820, through use of beam steering technology. The periphery may have an extended virtual display, 830, without the occlusion capability. The steering of the occlusion display may be gaze-controlled in a feedback loop by monitoring the observer's eye with eye-tracking mechanisms.

Figure 9:
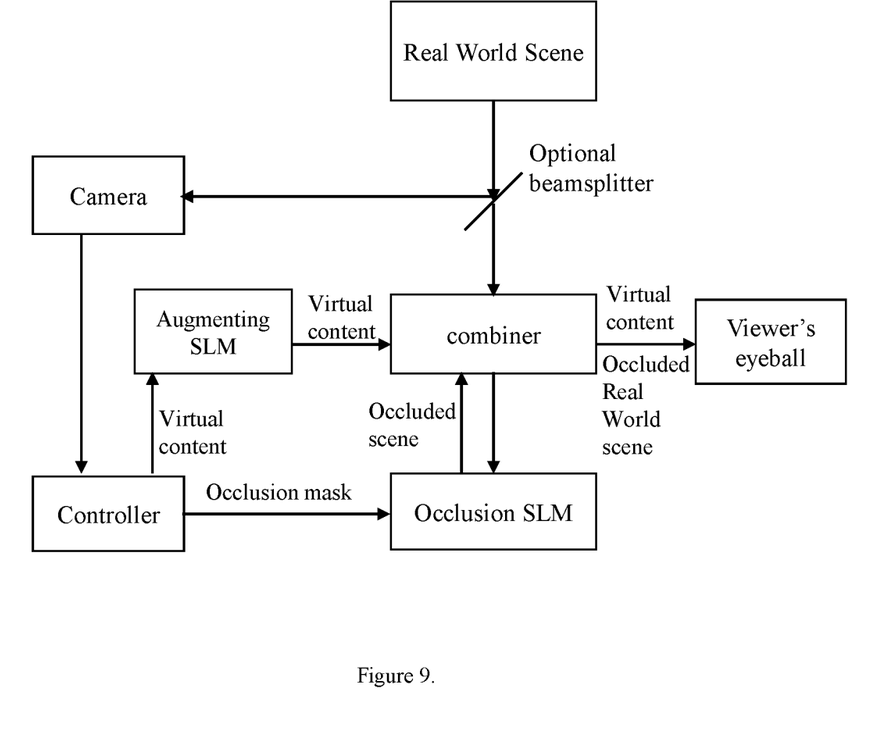
FIG. 9. System block diagram showing the decision tree for occlusion capable display.

FIG. 9 depicts a system block diagram showing the decision tree for occlusion capable display.

It is worth noting that the edges of all combiners and planar waveguides should be painted black to prevent stray light transmission or reflections.

Thickness of all freespace combiners is chosen such that their edges don't obscure any significant part of the image. Preferably, these combiners are designed to be thinner than the resolution of the healthy human eye.

In another embodiment, the contrast of the Occluding micro-display is controlled such that the user can decide if they want complete occlusion, or no occlusion or some partial occlusion that is adjustable. Such an adjustable user control may be needed for safety reasons or maybe useful for personal preferences. Such control of the contrast can help minimize the power consumption via control of the bit-depth. For example if very low power consumption is preferred, then only binary control cane be utilized (complete occlusion). Intermediate occlusion will require higher bit-depth and hence will consume higher power for the occluding micro-display. In case no-occlusion is needed, the power consumption of the occluding micro display can be negligible.

In another embodiment, the planar waveguides are designed such that these are not perpendicular to the incoming incident light from the real world view. A small angle maybe utilized such as 10-15 degrees away from normal incidence. In yet another embodiment, the planar waveguide is tilted away from normal incidence in both horizontal and vertical planes so that the enables a fashionable appearance to the industrial design of the HMD.

In another embodiment, the planar waveguides are weakly curved at least one axis so that these appear trendy in their industrial design. They can be convex facing the real world but concave facing the observer's eye such that the traversing of light from the convex to the concave side enables negating the optical power and hence preventing any image quality artifacts.

In yet another embodiment, additional components are provided such that the refractive power of the human observer's eye is measured in-situ, to determine at what depth distance their eye is focused at so as to render the digital content at that specific depth location (distance). This can be used to decimate unwanted resolution at depths that are farther away from the depth-of-focus of the current accommodation location so as to minimize the power consumption and bandwidth requirements. An IR diode (laser or LED) may be included in the illumination, with the combiner and optics designed such that an auto-refractor is included in the illumination system for such in-situ accommodation (refractive power) measurement. Such a device can provide tremendous power savings and hence battery life enhancement. Knowledge of the viewer's accommodation measurement allows for determining their visual and cognitive interest. This knowledge can enable targeted digital (or virtual) content presentation such as targeted advertisements at the appropriate depth distance.

The reflective polarizers as depicted for freespace combiners in some of the Figures can be made from a variety of materials such as but not limited to: wire-grid polarizers, McNeill polarizing beam splitters, Multilayer Optical Films or Holographic materials such as Polymer Films or bulk crystal based holographic materials such as iron-doped Lithium Niobate and others.

The reflective polarizers can be either laminated on to glass substrates, or sputtered on to glass using thin film coating processes, or glued using index-matching optical adhesives.

The glass substrates used for reflective polarizers can be either flat optical plates or glass prisms with appropriately angled surfaces so as to provide the functionality of appropriately routing the polarizations and wavelengths.

Anti-reflective coatings maybe appropriately utilized to minimize unwanted reflections and enhance the contrast of the occluding micro-display.

Mechanisms may be provided for rotating the cubic combiner element or parts of it such as to allow steering of the FOV. The rotation can be either in one axis or two axes so that both the Occluding micro-display and the Augmenting micro-display are both controlled in synchronization. The cubic combiner can be mounted on one or more motor(s) to angularly steer the reflective polarizer such that the FOV of the occluding micro-display can be increased for the ambient occlusion. If a certain side of the combiner is not available for mounting the motor, a spider legs-like frame can be provided such that the ends of the spider legs are attached to the reflective polarizer that needs to be rotated whereas the axis of rotation is provided at an appropriate location.

Although lens elements are not shown in these figures, those familiar in the art can comprehend appropriate lenses, their optical behaviors, such as F/number, and locations so as to complete the optical system functionality. In addition a tunable lens may be included in the optical design such that the location where an occluding micro-display needs to be focused at can be dynamically changed as per the viewer preference. Means maybe provided to measure the user accommodation distance in-situ and correspondingly, the tunable lens's focus may be tuned to specifically focus on this particular depth location.

The occluding micro-display is in principle a Light Valve which can be from amongst a variety of display technologies either transmissive or reflective such as but not limited to: Liquid Crystal on Silicon (LCoS), Micro Electro Mechanical Systems (MEMS) Digital Light Processing or Digital Micromirror Device, Liquid Crystal Displays (LCD), Reflective LCD, Transflective LCD, High Temperature Poly Silicon (HTPS) LCD, MEMS based shutters etc.

The augmenting micro-display is in principle a SLM which can be from amongst a variety of display technologies either self-emissive, transmissive or reflective such as but not limited to: micro Organic Light Emitting Diode (micro-OLED), micro Light Emitting Diode (micro-LED), Liquid Crystal on Silicon (LCoS), Micro Electro Mechanical Systems (MEMS) Digital Light Processing or Digital Micromirror Device, Liquid Crystal Displays (LCD), Reflective LCD, Transflective LCD, High Temperature Poly Silicon (HTPS) LCD, MEMS based shutters, Phase modulating SLM such as LCoS or MEMS based piston-type phase modulators etc.

Note that, although various polarization orientations are shown in these designs, these are not necessarily comprehensive and those familiar in the art can envision other variations but without deviating from the proposed architectures of this invention in principle. For example, the majority of ambient daylight is randomly polarized. But during some parts of the day there is a dominant sunlight polarization that is parallel to the horizon (horizontally) polarized. Hence it may be desirable to design some of the components to preferably block most of the ambient light that is horizontal so that the virtual image projected does not get washed out by the high brightness of the ambient light that is horizontally polarized. Conversely, there may be scenarios where the input polarizer is oriented to block the vertically polarized ambient light. This choice of polarization is design and application dependent and hence can be varied. The Linear Polarizer in FIGS. 8a and 8b can be designed such the user can rotate it either manually or through electronic control to orient it accordingly to let either horizontally polarized ambient light or vertically polarized ambient light as desired.

In another embodiment, an Augmented Reality Head Mounted Display is provided where the projection optical engine is located in the temple of the eye glasses. The optical engine relays the exit pupil onto the nose-pad of the glasses where a beam steering mirror is located. This beam steering mirror reflects the projected light onto a combiner which may have optical power. The combiner's optical power is such that it is located 2f distance away from the beam steering mirror and also 2f distance away from the viewer's eye pupil, where f is the focal length of the combiner. The beam steering mirror allows for the field of view (FOV) to be steered dynamically and on demand and hence appear larger FOV than that without beam steering.

In another embodiment, an Augmented Reality Head Mounted Display is provided where the projection optical engine is located in the temple of the eye glasses. The optical engine relays the exit pupil onto a beam steering mirror which is located just above the eye near the eyebrow. This beam steering mirror reflects the projected light onto a combiner which may have optical power. The combiner's optical power is such that it is located 2f distance away from the beam steering mirror and also 2f distance away from the viewer's eye pupil, where f is the focal length of the combiner. The beam steering mirror allows for the field of view (FOV) to be steered dynamical and on demand and hence appear larger FOV than that without beam steering.

In another embodiment, an Augmented Reality Head Mounted Display is provided where the display optical engine is located in the temple of the eye glasses and the computation engine is located behind the wearer's head and is connected to the two temple-tips of the glasses. The computation engine can be a smart phone or other computation device which is electrically connected with the display optical engine. The virtual content to be displayed to the wearer of the glasses originates from the computation engine. The conventional flat panel display integrated in the computation engine, e.g.: smart phone screen, can be turned OFF whenever the smart phone is electrically connected to the AR HMD glasses thus saving significant power.

Note, the terms micro-display and SLM are interchangeably used in this document.

BRIEF DESCRIPTION OF THE DRAWINGS

For a more complete understanding of the present disclosure and its advantages, reference is now made to the following description, taken in conjunction with the accompanying drawings, in which.

REFERENCES

1. Austin Wilson and Hong Hua, "Design and prototype of an augmented reality display with per-pixel mutual occlusion capability," Opt. Express 25, 30539-30549 (2017).

SUMMARY

In this disclosure, we teach methods and systems to provide mutual occlusion capability for optical see-through HMD applications. Various solutions are presented including compact waveguide based optics, freespace optics, and planar lightfield modulation approaches for HMD applications.

In one HMD embodiment, light from a real world scene is intercepted in front of an observer's eye, in their line-of-sight, by a combiner. Light is then routed to a spatial light modulator (SLM) for modulation purposes. Imaging optics are utilized to form an image of the real world scene on the SLM. The modulated image is then routed to the observer's eye for viewing. Additional optics are included to ensure that the image orientation and handedness are proper. A reflective SLM can serve as a selectable occlusion mask to control the localized contrast of the ambient real world scene and hence provides pixel-wise hard-edge occlusion capability.

In another feature, a freespace combiner is cleverly designed as a combination of an absorptive polarizer and a reflective polarizer (RP). Light from the real world scene is first linearly polarized by an absorptive linear polarizer (LP) along a preferred direction. The RP is oriented such that its polarization reflection axis is aligned substantially parallel to the incoming linearly polarized light. The RP is oriented at an angle such that it reflects the incoming polarized light substantially perpendicular to the observer's line-of-sight towards the SLM. A polarization modulating SLM such as based on Liquid Crystal on Silicon (LCoS), technology pixel-wise modulates the image hence acting as an occlusion mask. The SLM then reflects the modulated image back to the RP. Depending on the modulation state of individual pixels of the LCoS SLM, if a certain pixel does not change the incoming linear polarization, light from this pixel will interact with RP and reflect back towards the real world scene. On the contrary, if a certain pixel changes the incoming linear polarization by 90 degrees, then light from this pixel will interact with RP a second time and hence will transmit through the RP as it is orthogonally polarized to the polarization reflection axis of RP. This light's polarization can then be passively rotated by 90 using a Quarter Wave Plate at 45 degree slow axis orientation and a mirror. This light is hence reflected by said mirror back towards RP and since it is again rotated by 90 degrees hence it is the same linear polarization orientation as the light incoming on the first instance from the LP incident on RP, therefore the RP reflect this light a second time. This light is then routed to the observer's eye. Notice that the RP interacts with light either two or three times depending on the modulation state of the LCoS SLM pixels. For a first pixel state where incoming light's linear polarization remains unchanged, the RP interacts with this light three times, i.e.: first reflecting, secondly transmitting and thirdly reflecting again. Since, this light is routed to the observer's eye hence this first pixel state represents a transparent state to the observer. For a second pixel state where incoming light's linear polarization is changed by 90 degrees, the RP interacts with this light twice, i.e.: first reflecting, secondly reflecting again thereby exiting the combiner back towards the real world scene where it originally came from. Hence this second pixel state represents an opaque state to the observer. For any pixel-state that are intermediate between the two aforementioned linear polarization states, there will be correspondingly semi-transparent state as seen by the observer. In this manner a full range of transparency is available to the observer from transparent to completely opaque. The specific values of dynamic range between the transparent and opaque states will depend on the optical performance of the components utilized. It may range from 100:1 to 10,000:1 as is common for typical contrast values for LCoS projection systems.

In another feature of this invention, since a single RP is utilized to interact with the light three times for the transparent state, this novel design allows for the HMD optics to be very slim, compact and light weight as compared to other designs such as suggested by Wilson et al [1]. These characteristics are of utmost importance for making light weight smart glasses or HMD design. The RP acts both as a combiner and an illumination routing element. All four sides of the RP are utilized namely, 1) the real world side; 2) the Occluding SLM side; 3) the Quarter Wave and Mirror side; and 4) the Eyebox side.

In another feature, we utilize a fifth side of the cubic space of the combiner, whereby a second RP is collocated in the same cubic space of the combiner. The second RP is meant for injecting the digital virtual content using a second SLM or Microdisplay. The second RP is oriented such that the two Reflective Polarizers reflect orthogonal linear polarizations of light. The two Reflective Polarizers are angularly oriented such that they cross each other diagonally in the cubic combiner space. If a first RP is oriented at about 45 degree in the pitch axis, then the second RP should be oriented at about 45 degree in the yaw axis as seen from the observer's eye in their line of sight. In this manner we utilize a single cubic combiner space for two SLMs: one for Subtractive or Occlusion purpose and the second for Additive Digital virtual content purpose. This unique approach allows for a very compact and light weight optical system.

In another feature of this invention, the sixth side of the cubic combiner space can also be utilized for further compactness improvement of the optical system via use of the birdbath optical design.

The Occlusion SLM doesn't need to be very complicated rather it can be as simple as a binary amplitude SLM in some embodiments. The SLM also doesn't have to be color frame sequential as all it is doing is to pixel-wise shutter the incoming light from the ambient environment. A twist nematic type LCoS is a simple choice that is fairly wavelength (color) and polarization insensitive. The light from this Occlusion SLM can then be combined with light from another SLM that generates the virtual content for augmenting the real world scene. In other embodiments the Occlusion SLM can be grayscale modulation capable allowing for semi-transparency and opaqueness control of the real world scene. Such occlusion control is a fundamentally unique capability as being able to selectively subtract objects from the real scene have tremendous applications in advertising and marketing.

In another embodiment, a very compact planar architecture using a transmissive SLM and at least two lenslet arrays is utilized. The first lenslet array receives the angular lightfield from the real world scene in the line of sight of the observer. It then forms a spatial image at the transmissive SLM plane for modulation purposes. The modulated image is converted back into the angular lightfield by the second lenslet array via forming an exit pupil at the observer's eye.

In another embodiment, a very compact planar waveguide based solution is devised for a very compact optical system. The system has two waveguides each with a set of in-coupling and out-coupling gratings. Light from the real world scene is intercepted in the observer's line of sight and routed by the first waveguide towards the Occlusion SLM. The modulated image is coupled back into the user's line of sight via use of the second waveguide. This approach provides a very compact and slim optical system suitable for smart glasses applications.

In another embodiment, a polarization-independent wrap-around architecture is devised that uses SLMs that are polarization independent, hence providing roughly twice the optical efficiency of a polarization based architecture. This approach can be utilized for applications where higher transparency is desired.

An important feature of our polarization based optical see-through designs is that the observer's view is maintained almost perfectly in their line of sight without any noticeable image offset as compared to two-layer designs that wrap-around the optical path and require a lot of alignment steps. For some applications such as law enforcement and military, and health-care, this reduced image offset can be a critical enabling feature.

Another important feature of our polarization based single layer designs is the reduced size and volume as compared to two-layer designs that wrap-around the optical path hence our designs are half as compact in thickness, and half in volume, and several times lighter in weight due to absence of bulk prisms and using fewer optical components.

Besides the benefits in performance, such a technology enables unique use cases such as magically making objects disappear. For example, first an empty space is imaged. Second, an object is introduced into this space and an image is recorded. Third, with the use of mutual-occlusion technology, this object is blocked from the view of the observer. Fourth, with the help of the virtual content SLM, one can project the portion of the first image that covers the region within the silhouette of the first object. This makes the observer perceive as if the object disappeared magically. Such technology is hugely transformative, as it allows for specific portions of images to be modified or blocked from the view of the observer on the fly. An example would be an auto repairman, who is trying to fix an electrical issue in the hood of the car. With conventional HMD technology, the repairman cannot remove the unwanted portions of the engine equipment in the hood; and such other components and systems, e.g.: hydraulic, block their view of the complete electrical system. With mutual-occlusion technology, the hydraulic system may be completely blocked from the repairman's view and instead only the electrical system can be projected using the virtual content SLM so that they can focus on diagnosing and solving the issue in a timely and efficient manner. Such a technology can increase worker efficiency, reduce significant amount of cost and improve customer satisfaction.

Another example is a person driving in the dark with bright head-lights from the opposing traffic saturating the driver's vision and blocking their ability to discern objects on the road in front of them. With mutual-occlusion display technology, only the specific opposing direction where the bright headlights are coming from can be selectively dimmed down to the extent where they don't saturate the driver's vision and allow for road-safety for everyone involved. Notice the rest of the driver's field-of-view is not dimmed down which would have been the case if one simply provided a tinted window, hence enhancing the driver's vision and making it a safer and more pleasant driving experience.

What is claimed:

1. An electronic display apparatus, comprising:
   a controller;
   at least one polarization based optical combiner, OC, located in a line of sight of an observer, and in close proximity of the observer's eye; said OC having a plurality of ports and comprising:
   an absorptive linear polarizer, LP, having a transmission axis, $T_{LP}$; said LP located on a first port of said OC facing a real world scene;
   at least one reflective polarizer, RP, with a reflection polarization axis, $R_{RP}$, that is substantially parallel to $T_{LP}$;
   at least one spatial light modulator, SLM, located on a second port of said OC; said SLM comprising:
   a plurality of pixels; whereby each pixel can modulate light; and said SLM being connected to said controller;
   at least one powered optical element, S1, located along a light path between said LP and said SLM;
   a Quarter Wave Plate, QWP, whose slow axis is located at approximately 45 degrees from $T_{LP}$;
   and a Mirror;
   wherein said QWP and said Mirror are located at a third port of said OC; wherein said third port is located opposing said second port of OC;
   at least one powered optical element, S2, located along the light path between said RP and said mirror in third port of said OC;
   wherein said LP polarizes the incoming light from the real world scene from said first port of OC in a preferred linear orientation along its transmission axis, $T_{LP}$;

wherein said RP is oriented at an angle such that it reflects the incoming polarized light from said LP in first port to said second port;

wherein said powered optical element, S1, forms an image of the real world scene at said SLM for modulation purposes;

wherein said SLM modulates the incoming polarized light from said second port and in turn provides outgoing modulated light in at least one of two states of linear polarizations; wherein said modulated light outgoing from said SLM is reflected back at said second port of the OC; wherein one of the modulated light states of linear polarization from said second port is substantially perpendicularly polarized to $R_{RP}$ and hence it transmits from RP and emerges at said third port;

wherein said powered optical element, S2, relays an exit pupil at an Eyebox located in a fourth port of OC; said fourth port located opposing said first port;

wherein said QWP and Mirror combination in said third port of OC operate on the light and reflect it back at the third port of OC but this time the light is linearly polarized parallel to $R_{RP}$; wherein said RP reflects this light and routes it to said fourth port; wherein the light emerges at said exit pupil in said fourth port of OC for the observer's viewing thus allowing a see-through view to the observer;

wherein another of the modulated light states of linear polarization emerging from said SLM is substantially parallel polarized to $R_{RP}$ and hence it reflects from RP and emerges at said first port hence exiting the OC towards the real world scene; wherein such routing of light away from the observer's eye gives the perception of pixel-wise selective blocking of see-through view to the observer.

2. The electronic display apparatus defined in claim 1, includes:

a Microdisplay, MD meant for creating digital virtual image content;

a second reflective polarizer, RP2, with a reflection polarization axis, $R_{RP2}$, that is substantially perpendicular to $T_{LP}$ and also $R_{RP}$; said RP2 is oriented at an angle such that it reflects the incoming polarized light from said MD to said fourth port;

at least one powered optical element, S3, located between said MD and said second reflective polarizer, RP2, such that an exit pupil is formed for MD image at said fourth port of OC that is co-located with said exit pupil of real world scene thereby overlaying the SLM modulated real world scene with MD created digital virtual content in the Eyebox for the observer's viewing.

3. The electronic display apparatus defined in claim 2, where the MD is chosen from amongst one of the following: Liquid Crystal on Silicon, Micro Electro Mechanical Systems (MEMS), Digital Light Processing, or Digital Micromirror Device, Micro Organic Light Emitting Diode, Micro Light Emitting Diode, or Micro Electro Mechanical Systems Resonant Scanning Mirror.

4. The electronic display apparatus defined in claim 2, where another Linear Polarizer, is included between the two said reflective polarizer, RP, and RP2, for cleanup purposes to mitigate any unwanted light leakage from either the see-through path or the SLM path.

5. The electronic display apparatus defined in claim 2, where the two Reflective Polarizers, RP and RP2, are co-located in a single cubic space where they cross each other diagonally.

6. The electronic display apparatus defined in claim 5, where at least one of the two Reflective Polarizers, RP and RP2, has a cut running along its diagonal whereas the other Reflective Polarizer slides through said cut.

7. The electronic display apparatus defined in claim 6, where at least one of the two Reflective Polarizers, RP and RP2, is cut into two substantially parallel pieces along its diagonal.

8. The electronic display apparatus defined in claim 2, wherein at least one of said Reflective Polarizers, RP and RP2, is curved such that it additionally functions as said powered optical element S1 or S2 or S3.

9. The electronic display apparatus defined in claim 2, includes means to adjust the optical path length between said Microdisplay, MD, and said powered optical element, S3, such that virtual objects projected into the eye box appear to be at varied depth location in the real world scene from the observer such as near or far.

10. The electronic display apparatus defined in claim 1, where the SLM is chosen from amongst one of the following: Liquid Crystal on Silicon, Micro Electro Mechanical Systems, Digital Light Processing, or Digital Micromirror Device.

11. The electronic display apparatus defined in claim 1, includes means to adjust the optical path length between said powered optical element, S1, and said SLM so that a different depth location in the real world scene can be brought into focus and occluded properly; such means may be either translation such as mechanical, or electro-mechanical; or tunable focus optical elements.

12. The electronic display apparatus defined in claim 1, where the powered optical element, S1, maybe either refractive, reflective, diffractive or holographic.

13. The electronic display apparatus defined in claim 1, where the powered optical element, S1, resides on the same substrate as the Reflective Polarizer, RP.

14. The electronic display apparatus defined in claim 1, where RP is chosen from amongst at least one of the following: Wire Grid Polarizer, Multilayer Optical Films, Notch Reflective Polarizers, Bragg Reflective Polarizers, Volume Phase Gratings, Holographic Gratings, Volume multiplexed Holographic Gratings, Angle multiplexed Holographic Gratings, Polarization multiplexed Holographic Gratings, Liquid Crystal Gratings, Polymerized Liquid Crystal Gratings, MacNeille type thin film coated cube.

15. The electronic display apparatus defined in claim 1, where the apparatus is a see-through Head Mounted Display.

16. The electronic display apparatus defined in claim 1, where at least one of the powered optical elements is a variable focus optic.

17. The electronic display apparatus defined in claim 1, where rotational means are provided such as mechanical, or electro-mechanical; or beam steering optical to rotate the Reflective Polarizer, RP, such that a different portion of the real world scene, maybe occluded by the SLM.

18. The electronic display apparatus defined in claim 17, where said rotational means are connected to the observer's gaze direction.

19. The electronic display apparatus defined in claim 1, includes at least one Switchable Polarization Rotator; said Polarization Rotator capable of switching the linear polarization input light into one of two output linear polarization states at the command from the Controller; wherein one of said linear polarization states bypasses the SLM and substantially transmits through said Reflective Polarizers and emerges at the Eyebox in said fourth port of OC; wherein a second of said linear polarization states is substantially parallel to, $T_{LP}$, such that this light is reflected by RP and routed towards said SLM in said second port of OC.

20. The electronic display apparatus defined in claim 1, includes a reflective polarizer, and a camera; wherein said reflective polarizer is located preceding the absorptive linear polarizer, closer to the real world scene, such that it reflects at least one linear polarization of light from the real world scene towards said camera.

21. The electronic display apparatus defined in claim 1, includes at least one Quarter Wave Plate, QWP, located preceding the absorptive linear polarizer, LP, on said first port of OC, closer to the real world scene: wherein said QWP has it's slow axis oriented at substantially 45 degrees from the transmission axis, $T_{LP}$, of LP, such that it randomizes the polarization of light incident from the real world scene on said apparatus.

22. The electronic display apparatus defined in claim 1, includes an Augmenting SLM and a partially transparent see through combiner based on a waveguide; wherein said waveguide is located in said fourth port of OC.

23. The electronic display apparatus defined in claim 1, where said SLM is able to modulate light incident on each pixel in their transparency in the range of 0% to 99%.

24. An electronic display apparatus, comprising:
a controller;
a first lens array located facing a real world scene; said lens array meant to convert light from angular domain to spatial domain;
at least one spatial light modulator, SLM, comprising an array of pixels; whereby each pixel can modulate light; and said SLM being connected to said controller;
wherein said SLM is located a first distance, D1, away from said first lens array;
a $2^{nd}$ lens array located near an observer's eye; said lens array meant to convert light back from spatial domain to angular domain; wherein said $2^{nd}$ lens array is located a second distance, D2, away from said SLM;
wherein said controller commands said SLM to modulate light from selected pixels of said SLM such that the observer perceives an object at corresponding angular locations in the real world scene to be pixel-wise selectively blocked or modulated in a visible intensity from the observer's view.

25. The electronic display apparatus in claim 24, wherein said distances, D1 and D2 between said first and second lens arrays and said SLM are substantially equal to the focal length of the individual lenslets in the array.

26. The electronic display apparatus defined in claim 25, wherein said means for optical path distance adjustment are chosen from amongst one of the following: mechanical, electrical, Piezo-electric, electronic, optical, electro-optical, or opto-mechanical.

27. The electronic display apparatus defined in claim 24, includes means to dynamically adjust the optical path distance, D1, between said SLM and said first lens array such that real objects at varied depth locations in the real world scene from the observer such as near or far can be blocked or attenuated from the observer's view properly.

28. The electronic display apparatus defined in claim 24, where the SLM is chosen from amongst one of the following: Transmissive Liquid Crystal Display, Transmissive MEMS shutter array, Twist Nematic Liquid Crystal, Super Twist Nematic Liquid Crystal, Vertically Aligned Liquid Crystal, Parallel Rubbed Liquid Crystal, Anti-Parallel Rubbed Liquid Crystal, pi-cell Liquid Crystal, Ferro-electric Liquid Crystal, Polymer Dispersed Liquid Crystal, Polymer Stabilized Liquid Crystal, or Polymer Network Liquid Crystal.

29. The electronic display apparatus in claim 24, includes at least one absorptive linear polarizer, LP1, located facing the real world scene; wherein said LP1 is meant to polarize the lightfield incident on it from the real world scene.

30. The electronic display apparatus in claim 29, includes at least a 2nd absorptive linear polarizer, LP2, located facing the Eyebox, wherein the polarization transmission axes of said LP1 and LP2 pair are either substantially parallel or substantially perpendicular to one another.

31. The electronic display apparatus defined in claim 30, a reflective polarizer, RP, is incorporated on the outside casing of the display such that the polarization reflection axis of said RP is orthogonal to the first linear polarizer's transmission axis utilized for the display.

32. The electronic display apparatus defined in claim 24, includes an array of baffles to prevent light leaking from one lenslet into a neighboring pixel of said SLM and control over directionality.

33. The electronic display apparatus defined in claim 32, wherein said SLM has fine pixel resolution in the center of the FOV and gradually coarser pixel resolution in the periphery of the FOV.

34. The electronic display apparatus defined in claim 24, wherein said SLM has a plurality of different pixel sizes such that real world objects of various angular dimensions can be occluded or attenuated depending upon their angular location within the FOV.

35. The electronic display apparatus defined in claim 24, includes an Augmenting SLM and a partially transparent see through combiner based on a waveguide; wherein said waveguide is located in said fourth port of OC.

36. The electronic display apparatus defined in claim 24, where said SLM is able to modulate light incident on each pixel in their transparency in the range of 0% to 99%.

37. An electronic display apparatus, comprising:
a controller;
at least two planar waveguides located between a real world scene and an observer's eye; each of said planar waveguides having a pair of in-coupling and out-coupling gratings;
at least one spatial light modulator, SLM, comprising an array of pixels; whereby each pixel can modulate light; and said SLM being connected to said controller;
at least one lens;
and at least one Mirror;
wherein said SLM is located between a first out-coupling grating of a first planar waveguide and said lens;
wherein lightfield from the real world scene routes through the first planar waveguide, in-coupling and out-coupling gratings to said SLM; wherein said lens forms a spatial image of the real world scene on said SLM; whereupon said controller commands said SLM to attenuate light from selected pixels of said SLM; whereupon said modulated image light reflects from said Mirror, and encounters said $2^{nd}$ planar waveguide, the $2^{nd}$ pair of in-coupling and out-coupling gratings and emerges in an Eyebox such that the observer perceives an object at corresponding angular locations in the real world scene to be pixel-wise selectively blocked or modulated in a visible intensity from the observer's view.

38. The electronic display apparatus defined in claim 37, includes at least a pair of linear polarizers, a Mirror, and a Quarter Wave Plate, QWP, whose slow axis is located at approximately 45 degrees from the transmission polarization axis of one of said polarizers; wherein said QWP is located in front of said Mirror.

39. The electronic display apparatus defined in claim 37, where the SLM is chosen from amongst one of the following: Liquid Crystal on Silicon, Micro Electro Mechanical Systems, Digital Light Processing, or Digital Micromirror Device.

40. The electronic display apparatus defined in claim 37, includes:
   a Microdisplay, MD, meant for creating digital virtual image content; and
   a 3rd planar waveguide;
   wherein said 3rd planar waveguide combines the light from said SLM thereby overlaying the SLM modulated real world scene with MD created digital virtual content in the Eyebox for the observer's viewing.

41. The electronic display apparatus defined in claim 40, where the MD is chosen from amongst one of the following: Liquid Crystal on Silicon, Micro Electro Mechanical Systems (MEMS), Digital Light Processing, or Digital Micromirror Device, Micro Organic Light Emitting Diode, Micro Light Emitting Diode, or Micro Electro Mechanical Systems Resonant Scanning Mirror.

42. The electronic display apparatus defined in claim 37, where said SLM is able to modulate light incident on each pixel in their transparency in the range of 0% to 99%.

43. An electronic display apparatus, comprising:
   a controller;
   at least one optical combiner element located between a real world scene and an observer's eye;
   at least one spatial light modulator, SLM, comprising an array of pixels; whereby each pixel can modulate light; and said SLM being connected to said controller;
   at least one curved optical surface;
   wherein said curved optical surface is located between said combiner and said SLM;
   wherein lightfield from a real world scene routes through said combiner and said curved optical surface thus forming a spatial image of the real world scene on said SLM; whereupon said controller commands said SLM to modulate light from selected pixels of said SLM;
   whereupon said SLM substantially selectively modulates light from selected pixels of the real world scene image into a plurality of output states; wherein at least a first of said output states is substantially transparent while a second output state is substantially opaque;
   whereupon said selectively modulated lightfield is routed to an exit pupil for viewing by the observer's eye;
   whereupon the observer's eye perceives an object at corresponding angular locations in the real world scene to be selectively modulated in a visible intensity from the observer's view.

44. The electronic display apparatus defined in claim 43, includes at least one pupil relaying mechanism; said pupil relaying mechanism located between the SLM and the observer's eye; and said pupil relaying mechanism being responsible for relaying the pupil of the modulated SLM image of the real world scene into the observer's eye.

45. The electronic display apparatus defined in claim 43, where the SLM is chosen from amongst one of the following: Liquid Crystal on Silicon, Micro Electro Mechanical Systems, Digital Light Processing, or Digital Micromirror Device.

46. The electronic display apparatus defined in claim 43, where the combiner is a freespace combiner.

47. The electronic display apparatus defined in claim 43, includes at least one linear polarizer, a Mirror, and a Quarter Wave Plate, QWP, whose slow axis is located at approximately 45 degrees from the transmission polarization axis of said linear polarizer; wherein said QWP is located in front of said Mirror.

48. The electronic display apparatus defined in claim 43, where the combiner is immersed in an optical medium.

49. The electronic display apparatus defined in claim 43, where the combiner is a waveguide combiner.

50. The electronic display apparatus defined in claim 43, includes a Microdisplay, MD, meant for creating digital virtual image content.

51. The electronic display apparatus defined in claim 50, includes a $2^{nd}$ combiner for injecting digital virtual image content from said Microdisplay, MD, thereby overlaying the transparency modulated SLM image of the real world scene with MD created digital virtual content in the Eyebox for the observer's viewing, hence providing the observer with an image with high contrast and wide dynamic range.

52. The electronic display apparatus defined in claim 43, includes a camera located substantially near the observer's viewing point of the real world scene; said camera connected to said controller; whereby said camera provides the information about scene image such as lighting, lighting direction and orientation, saturation, intensity, illuminance, white point, dynamic range and similar to the controller; said controller determines which image pixels to selectively attenuate or dim down and conveys the same via a command to the SLM for corresponding SLM pixels to be selectively controlled to impact their visibility to the observer.

53. The electronic display apparatus defined in claim 43, where said plurality of output states range in their transparency in the range of 0% to 99%.

54. An electronic display apparatus, comprising:
   a controller;
   at least one spatial light modulator, SLM, comprising an array of pixels; whereby each pixel can modulate light; and said SLM being connected to said controller;
   at least one image forming element;
   wherein said electronic display apparatus is located between a lightfield emanating from a real world scene and an observer's eye;
   wherein said image forming element converts said lightfield from said real world scene into a spatial image of the real world scene on said SLM and vice versa;
   whereupon said controller commands said SLM to modulate light from selected pixels of said SLM;
   whereupon said SLM substantially selectively modulates light from selected pixels of the real world scene image into a plurality of output states; wherein at least a first of said output states is substantially transparent while a second output state is substantially opaque;
   whereupon said selectively modulated lightfield is routed to an exit pupil for viewing by the observer's eye;
   whereupon the observer's eye perceives an object at corresponding angular locations in the real world scene to be selectively modulated in a visible intensity from the observer's view.

55. The electronic display apparatus defined in claim 54, where the SLM is substantially transmissive in nature.

56. The electronic display apparatus defined in claim 54, where the SLM is chosen from amongst one of the following: Liquid Crystal Display, High Temperature Poly-silicon based Liquid Crystal Display, Transflective Liquid Crystal Display, Parallel-Aligned Liquid Crystal Display, Anti-Parallel-Aligned Liquid Crystal Display, Twist Nematic Liquid Crystal Display, Super Twist Nematic Liquid Crystal Display, Vertically Aligned Liquid Crystal, Parallel Rubbed Liquid Crystal, Anti-Parallel Rubbed Liquid Crystal, pi-cell Liquid Crystal Display, Ferro-electric Liquid Crystal, Polymer Dispersed Liquid Crystal, Polymer Stabilized Liquid Crystal, or Polymer Network Liquid Crystal, and Transmissive MEMS shutter array.

57. The electronic display apparatus defined in claim 54 where said at least one image forming element consists of at least one lens array.

58. The electronic display apparatus defined in claim 54 includes additional optical element to correct for image erectness and orientation.

59. The electronic display apparatus defined in claim 54, includes at least one pupil relaying mechanism; said pupil relaying mechanism located between the SLM and the observer's eye; wherein said pupil relaying mechanism relays the lightfield as modulated by said SLM into an exit pupil located at the observer's eye.

60. The electronic display apparatus defined in claim 54, includes at least one linear polarizer.

61. The electronic display apparatus defined in claim 60, includes at least one Quarter Wave Plate, QWP, whose slow axis is located at approximately 45 degrees from the transmission polarization axis of said linear polarizer.

62. The electronic display apparatus defined in claim 54, includes at least one circular polarizer.

63. The electronic display apparatus defined in claim 54, where the controller receives said command via a user interface.

64. The electronic display apparatus defined in claim 54, where said plurality of output states includes at least one semi-transparent state.

65. The electronic display apparatus defined in claim 54, where said plurality of output states range in their transparency in the range of 0% to 99%.

* * * * *